United States Patent [19]

Fretz, Jr.

[11] Patent Number: 4,793,703
[45] Date of Patent: Dec. 27, 1988

[54] LAMINATED GLASS LENSES

[75] Inventor: Edward R. Fretz, Jr., Corning, N.Y.

[73] Assignee: Corning Glass Works, Corning, N.Y.

[21] Appl. No.: 80,902

[22] Filed: Aug. 3, 1987

[51] Int. Cl.$^4$ .......................... G02C 7/10; G02C 7/02
[52] U.S. Cl. ................................. 351/163; 351/166; 351/177
[58] Field of Search ................. 351/163, 166, 177

[56] References Cited

U.S. PATENT DOCUMENTS

| 4,079,160 | 3/1978 | Philipson | 351/159 |
|---|---|---|---|
| 4,264,156 | 4/1981 | Spycher | 351/166 |
| 4,268,134 | 5/1981 | Gulati et al. | 351/163 |
| 4,311,762 | 1/1982 | Spycher et al. | 351/163 |
| 4,679,918 | 7/1987 | Ace | 351/163 |

Primary Examiner—Bruce Y. Arnold
Assistant Examiner—Terry S. Callaghan
Attorney, Agent, or Firm—Clinton S. Janes, Jr.

[57] ABSTRACT

This invention relates to the fabrication of three-layer composite lenses especially suited for ophthalmic applications. The lenses comprise a thin layer of an inorganic glass, desirably photochromic glass, an organic plastic, and an organic adhesive exhibiting flexibility and can be cured at temperatures in the vicinity of room temperature. In general, the linear coefficient of expansion of the glass ranges between about $60-120\times10^{-7}/°C$. and that of the plastic between about $200-700\times10^{-7}/°C$.

27 Claims, 1 Drawing Sheet

LAMINATED GLASS LENSES

BACKGROUND OF THE INVENTION

Inorganic glasses conventionally employed in the fabrication of lenses for ophthalmic applications exhibit relatively high density. This density can result in some discomfort to the wearer of eyeglasses, particularly to the wearer of lenses having a high power prescription. Organic plastics used in the fabrication of ophthalmic lenses exhibit relatively low densities, but are inferior to glass lenses with respect to hardness and scratch resistance. Furthermore, no organic photochromic material has been developed which is not subject to fatigue; i.e., the organic photochromic materials quickly lose their capability of reversibly darkening. Therefore, both from the desire to reduce the weight of the lenses and the desire to fabricate lenses demonstrating photochromic behavior, considerable research has been conducted to prepare glass/plastic composite lenses.

One such line of research has involved the incorporation of glass particles into a matrix of an organic plastic. An example of that research is illustrated in U.S. Pat. No. 4,581,288. However, total avoidance of light scatter and distortion has been difficult to achieve in that practice.

Much more extensive research has been directed to lenses having a laminated structure. Hence, the patent literature is replete with disclosures of composite lense consisting of one or more glass laminae with one or more plastic laminae. Some of those disclosures describe products wherein the glass and plastic laminae are bonded directly to one another. In other structures the glass and plastic laminae are bonded together through an adhesive layer positioned therebetween. The following U.S. Pat. Nos. are representative of such disclosures: 4,227,950, 4,246,207, 4,264,156, 4,268,134, and 4,311,762.

Much of the prior research has involved the combination of glass laminae and plastic laminae consisting of diethylene glycol bis(allyl carbonate) resin, a specific thermosetting resin commercially available from PPG Industries, Pittsburgh, Pa. under the trademark CR-39. Bonding therebetween has frequently been accomplished through silicone-and/or urethane-type adhesives. Those products have encountered optical problems resulting from uneven layers of adhesive and/or glass, and/or structural problems of delamination when subjected to temperature cycling and/or to high humidities.

Therefore, the overall objective of the present invention was to fabricate laminated composite lenses from laminae of inorganic glass and organic plastic which provide optical quality transmission and are free from the structural problems which have plagued such composite lenses in the past.

SUMMARY OF THE INVENTION

One basic problem which must be faced in any research directed to the formation of glass/plastic laminates is the large difference in thermal expansion demonstrated by the materials. For example, CR-39, the predominant plastic employed in ophthalmic applications, exhibits a linear coefficient of thermal expansion (0°–100° C.) of about $1200$–$1500 \times 10^{-7}/°$ C., whereas glasses commonly used in ophthalmic lenses exhibit coefficients of thermal expansion (0°–300° C.) ranging between about $60$–$120 \times 10^{-7}/°$ C., with the most widely-marketed photochromic glass, viz., PHOTOGRAY EXTRA available from Corning Glass Works, Corning, N.Y., having a linear coefficient of thermal expansion of about $65 \times 10^{-7}/°$ C. As can immediately be appreciated, such an extreme difference in thermal expansion can lead to delamination of the layers when the composite body is exposed to thermal cycling.

That situation has led to extensive experimentation with various adhesives in an effort to overcome that problem. U.S. Pat. No. 4,679,918 is illustrative of efforts to use adhesives exhibiting high elongation with the aim to provide a bond between the laminae demonstrating some resiliency.

That patent describes in detail a three-ply lens assemblage consisting of a thin layer of inorganic ophthalmic glass, preferably a photochromic glass, bonded to an organic plastic layer, suitably CR-39, through a highly elastic adhesive. The rear surface of the glass layer has a different radius of curvature from that of the front surface of the plastic layer such that the space between the two layers comprises a tapered gap which is filled with the adhesive. The tapered gap is so designed that the edge thickness of the elastic adhesive is sufficient to counteract the increase in diameter of the plastic layer with respect to the diameter of the glass layer resulting from the inherent differences in thermal expansion of the glass and plastic. Thus, the use of a tapered gap between the glass and the plastic and the use of an adhesive exhibiting high elongation are stated to provide lenses which will not delaminate when subjected to thermal cycling. The adhesive described in the application consisted of a long chain silicone polymeric elastomer.

The preferred embodiment of the instant invention is also directed to a three-component laminated lens structure comprising a thin layer of inorganic glass, desirably a photochromic glass, bonded to an organic plastic through an adhesive. The inventive laminated assemblage differs significantly from previous laminates, however, with respect to both the plastic and the adhesive employed. Hence, the plastic utilized has a linear coefficient of thermal expansion considerably lower than that of CR-39, preferably less than one-half that of CR-39, and the adhesive used exhibits flexibility and can be cured in the vicinity of room temperature or slightly higher. In general, the linear coefficient of thermal expansion of the plastic will range between about $200$–$700 \times 10^{-7}/°$ C., with values between about $400$–$600 \times 10^{-7}/°$ C. being preferred. In the most preferred embodiments of the invention, the indices of refraction of the plastic and the adhesive match that of the glass. The adhesive is applied to the glass and plastic laminae and cured at near room temperature to yield an essentially stress-free assemblage. The adhesive layer has sufficient flexibility and thickness to allow for expansion differences of the glass and plastic when exposed to thermal cycling.

Although there are acrylic, polycarbonate, silicone, urethane, and polyimide plastics demonstrating coefficients of thermal expansion below that of CR-39, one excellent example of a plastic exhibiting a low expansion is the epoxy resin Hysol OSO100, marketed by Hysol Division, the Dexter Corp., Industry, Calif. That plastic is a cycloaliphatic epoxy resin cured with a cyclic anhydride. It exhibits very good optical properties and its refractive index can be readily modified, as will be explained below. The resin demonstrates a linear coefficient of thermal expansion over the range of 0°–100° C. of about $450 \times 10^{-7}/°$ C., i.e., considerably less than one-half that of CR-39. The resin is cured at elevated temperatures and can be easily ground and polished to form an optical element.

Adjustment of the refractive index for both the plastic epoxy resin and the adhesive epoxy resin can be achieved by changing the ratio of aromatic to aliphatic material in the resin formulation. Aromatic epoxy resins raise the refractive index, whereas aliphatic epoxy resins decrease the refractive index. For example, Hysol OSO100 epoxy resin is completely aliphatic and exhibits a refractive index of 1.511 when fully cured. That value can be raised to the index of the ophthalmic glass, viz., 1.523, by adding the aromatic epoxy resin DER 332, marketed by Dow Chemical Corp., Midland, Mich.

Whereas there are acrylic, silicone, and urethane adhesives which exhibit flexibility, an adhesive that can be cured at room temperature and which can be modified to demonstrate great flexibility is Epo-Tek 310, marketed by Epoxy Technology, Billerica, Mass. That epoxy resin exhibits excellent optical properties and moderate flexibility. The flexibility can be substantially increased through the addition thereto of an aromatic monofunctional epoxy diluent, e.g., DY-023, marketed by Ciba-Geigy, Hawthorn, N.Y. The refractive index of the resin can readily be adjusted to match that of the common ophthalmic glass, viz., 1.523, as will be explained below. Inasmuch as the transition temperature ($T_g$) of the adhesive is approximately that of room temperature, its coefficient of thermal expansion over the normal range of temperatures to which eyeglasses are exposed is, for all practical purposes, unimportant. That is, the resin is not in a truly glassy state over that range of temperatures, but is somewhat rubbery. Hence, the resin will flex and thereby accommodate or eliminate stress.

The development of flexible epoxy resins for use as adhesives involved a combination of concepts. Thus, several aliphatic epoxy resins were incorporated into the formulations. Those materials provide "soft" resin segments contributing to the overall flexibility of the resin. Representative of such resins include: DER 732, marketed by Dow Chemical; Epo-Tek 310A, marketed by Epoxy Technology; XB-4122, marketed by Ciba-Geigy, WC-68, marketed by Wilmington Chemical, Wilmington, Del.; and Anthiol R-12, marketed by Pacific Anchor, Richmond, Calif.

The amount of crosslinking can also be adjusted by the use of mono-epoxy diluents such as RD-1 and DY-023 from Ciba-Geigy; or by varying the stoichiometry of the constituents. The amount of crosslinking affects the flexibility of the resin.

A desired goal to be achieved in the adhesives was to have a transition temperature ($T_g$) below room temperature. Another desired objective to be achieved in the adhesives was to have a curing temperature in the vicinity of room temperature ($\approx 0°$–$30°$ C.) such that there would be very little stress in the laminated lenses at normal use temperatures. Those desires led to the selection of aliphatic amines as crosslinking agents. Their aliphatic nature can add to the flexibility of the resin.

As was observed above, acrylic, polycarbonate, silicone, urethane, and polyimide resins can be prepared which exhibit coefficients of thermal expansion below that of CR-39. One example of an acrylic resin that has been found to be operable in the inventive composite lenses is EHT-245 ST, marketed by Rohm and Haas, Philadelphia, Pa. That material is an imide-modified, thermoplastic acrylic resin which can be injection molded to form a plastic member of the inventive laminated lenses. The resin demonstrates a linear coefficient of thermal expansion of about $400 \times 10^7/°$ C. and a refractive index of 1.527.

The preferred inventive laminated assemblages are constructed to have a layer of glass of uniform thickness as the front component and a layer of adhesive of uniform thickness between the glass and plastic members. The uniform thickness of the adhesive layer is obtained by having virtually similar radii of curvature on the rear surface of the glass layer and the front surface of the plastic component. Hence, there is essentially no taper in the space between the glass and the plastic. The curves in the front and rear surfaces of the glass layer are substantially identical to yield a plano glass layer. The thickness of the adhesive is held between about 0.0075"–0.020" (=0.188–0.50 mm) with a thickness of about 0.010" being preferred. The thickness of the glass layer is maintained between about 0.5–1.5 mm, with a thickness between about 1–1.25 mm being preferred.

Hence, the preferred inventive laminated lenses consist of two plano layers, i.e., the glass and the adhesive, with the power of the lenses being obtained by changing the curvature of the rear surface of the plastic member. Having an essentially identical refractive index in each of the three layers and two plano layers in the front portion of the lens makes the optics simpler and eliminates power problems from the front two layers of the lenses. The feature of utilizing two plano layers in the front portion of the composite lens and varying the power of the lens solely by changing the curvature of the rear surface of the plastic member further distinguishes the present inventive lens structure from those of previous laminates. Having an essentially identical refractive index in each of the three layers also reduces problems of optical distortion from the inner surfaces of the layers.

In summary, the thicknesses of the layers and the natures of the plastic and adhesive layers work together to provide lenses of exceptional optical quality and to inhibit delamination of the layers when subjected to temperature excursions and high humidities.

It will be appreciated that other lens constructions are possible wherein the advantages of utilizing the organic plastics and adhesives described above can be enjoyed. For example, a five-component laminated structure can be fashioned consisting of a glass element adhesively bonded between two plastic members. Such an assemblage can exhibit the same light weight and resistance to delamination demonstrated by the preferred three-component laminated structures, and permits easy surface tinting of the plastic members when that is desired. An example of such an assemblage is provided in U.S. Pat. No. 4,264,156.

That patent, however, does not disclose two vital features of the present inventive laminated structure:

(1) the use of an organic plastic having a linear coefficient of thermal expansion within the range of about $200$–$700 \times 10^7/°$ C.; on the contrary the patent describes using CR-39; and (2) the use of an organic adhesive that exhibits flexibility and which can be cured at temperatures in the vicinity of room temperature to provide an essentially stress-free bond between the glass layer and the plastic layer.

Customarily, the two organic plastic layers in the present inventive lenses will be fashioned from the same compositions as will the two adhesives used. That course of action is not demanded, however, so long as the physical properties of each comply with the requirements for those components as set out for the present inventive materials.

In like manner to the tapered gap construction underlying the subject matter of U.S. Pat. No. 4,679,918 discussed above, U.S. Pat. No. 4,264,156 relies upon specifics of assemblage to alleviate bonding stress between the glass and the plastic layers. Thus, in the latter patent the circumferential border region of the glass layer is relieved from adhesive bonding with the two plastic layers such that the outer edge of the glass is essentially free of stress.

Such structural devices are not necessary with the present inventive materials in assembling five-component laminated systems and self-evidently add to the complexity of forming such systems. That is not to say, however, that the inventive materials would not be operable in such constructions.

U.S. Pat. No. 4,268,134 also describes the production of five-component laminated lens systems consisting of a glass layer adhesively bonded between two plastic members. The plastic members are of the CR-39 type and the adhesive exhibits a tensile strength of at least 4000 psi, a shear strength of at least 2000 psi, and an elastic modulus not exceeding 10,000 psi. Curing of the adhesive was conducted at 80° C.

Whereas the assemblages of that patent did not require the structural devices forming the bases of U.S. Pat. Nos. 4,679,918 and 4,264,176, the same two critical features of the present invention which were absent in those patents are likewise absent here, viz.:

(a) the use of an organic plastic element having a linear coefficient of thermal expansion within the range of about $200-700 \times 10^7/°$ C.; and (b) the use of an organic adhesive that exhibits flexibility and which can be cured at temperatures in the vicinity of room temperature.

In summary, although the formation of five-component laminated lens systems is readily possible with the present inventive materials, because of the lower resistance to scratching demonstrated by current organic plastics, the preferred laminate configuration utilizes a glass element as the outer layer; hence, the three-component structure constituting the preferred embodiment of the present invention.

DESCRIPTION OF PREFERRED EMBODIMENTS

Figure 1:
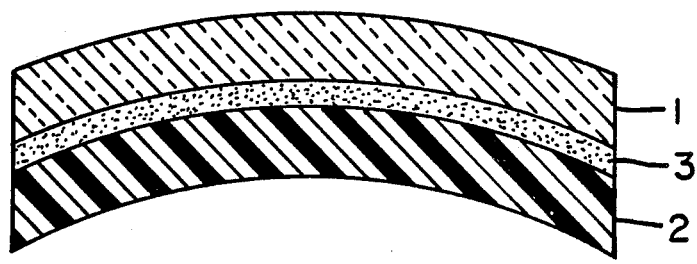
FIG. 1 is a schematic illustration in cross section of a three-component laminated lens system provided in accordance with this invention comprising a glass front surface layer 1 and a plastic back surface layer 2 bonded together by an adhesive layer 3.
Figure 2:
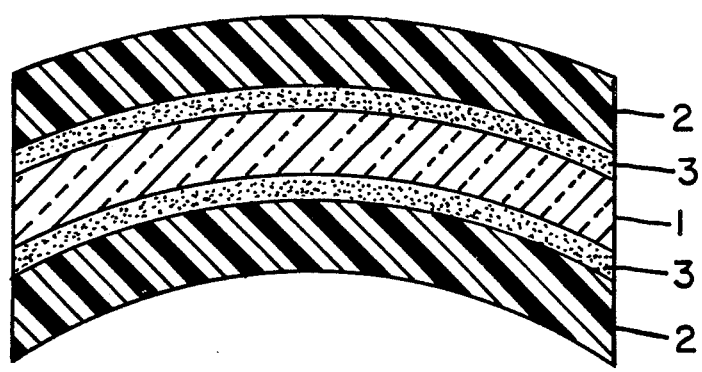
FIG. 2 is a schematic illustration in cross section of a five-component laminated lens system provided in accordance with this invention comprising a glass element 1 bonded between two plastic members 2 through adhesive layers 3.

A refractive index corrected epoxy resin suitable for use as the plastic component of the inventive three-ply laminated lenses was prepared as follows:

A mixture consisting of 20 grams Hysol OSO100A, 5 grams DER 332, and 23.5 grams Hysol OSO100B was heated to about 50° C. with stirring until a homogeneous solution was obtained. That solution was poured into the bottom half of a curved glass mold having a diameter of 3" which had previously been coated with a mold release agent (QI-9770, marketed by Dow-Corning Corp., Midland, Mich.). A silicone gasket was placed on top of the mold and the top half of the mold (also coated with mold release) brought down on the gasket. After placing a one-half pound weight ($\approx 228.8$ grams) on top, the casting was cured by introducing the mold into a furnace, the temperature therein raised at a rate of 10° C./minute to 150° C., the mold held at that temperature for 5 hours, and the mold then cooled at a rate of about 10° C./minute to room temperature. The refractive index of the cured body was measured at about 1.523.

Plano curved pieces of ophthalmic glass having cross sections of about 1–1.5 mm and diameters of about 65–75 mm were washed thoroughly, dried, and treated with a silane, e.g., Z-6020, marketed by Dow-Corning. The silane treatment was conducted with a hydrolyzed 3% solution of the silane in water or in 95% ethanol. The glass was treated with the silane for 15 minutes, rinsed in deionized water, baked for 1 hour at 120° C., rinsed again in deionized water, and then dried.

The general procedure for preparing the inventive laminates contemplates the following steps:

(a) a plano curved glass piece was placed in a holding fixture with the concave surface of the piece face up;

(b) about 1.5 grams of an adhesive were placed onto the glass piece;

(c) three 0.010" thick strips of TEFLON having a width of about 0.25 were clamped onto the glass surface in a manner such that the strips extended about 0.125" in from the circumference of the glass piece;

(d) the plastic piece was placed atop the glass and gently lowered down, the plastic having the same curvature as the glass, but of slightly larger diameter, such as to permit any air bubbles to flow to the edge of the glass piece;

(e) the plastic piece was hand pressed firmly down on the TEFLON spacers to form a uniformly thick layer of adhesive between the glass and plastic pieces;

(f) clamps were applied to hold the assemblage together for curing of the adhesive;

(g) the adhesive was cured in accordance with the curing schedule set out below for each adhesive formulation; and then (g) after curing the adhesive, the assemblage was removed from the fixture and the glass surface cleaned of any excess adhesive.

The composite lens may thereafter be ground, polished, and edged in the normal manner utilizing conventional equipment.

When adhesives cured through exposure to ultraviolet radiation were employed, the same procedure was followed except that curing was achieved by placing the assemblage with the plastic up under an ultraviolet lamp for the prescribed period of time.

It will be appreciated that the procedure outlined above reflects laboratory practice only; that is to say, in scaling up for commercial production of such laminated lenses, the parameters of the steps and perhaps the steps, themselves, may be altered.

Laminated lenses prepared according to the above general procedure employing the adhesive formulations reported below were exposed for more than 30 days in a humidity cabinet operating at 50° C. and 98% relative humidity, and for more than 30 days' temperature cycling between −40° C. and +80° C. (2 hour cycle time) with no delamination or development of a hazy appearance.

Several formulations of adhesives were prepared and curing schedules were devised therefor as recorded below:

Formulation A

A mixture consisting of 3 grams DER 332, 2 grams DER 732, 0.5 gram RD-1 (butyl glycidyl ether), and 1.85 grams Epi-Cure 8799 (an aliphatic polyamine marketed by Interez, Louisville, Ky.), was stirred until a homogeneous solution was secured. This solution was cured for 48 hours at room temperature followed by postcuring for 75 hours at 55° C. The transition temperature ($T_g$) for the cured material is 16° C. and the refractive index is 1.527.

Formulation B

A mixture consisting of 3 grams DER 332, 2 grams DER 732, 1 gram RD-1, and 2.15 grams Epi-Cure 8799 was stirred until a homogeneous solution was achieved. This solution was cured for 48 hours at room temperature followed by postcuring for 63 hours at 55° C. The $T_g$ of the cured adhesive is 13° C. and the refractive index is 1.529.

Formulation C

A mixture consisting of 6 grams DER 332, 4 grams DER 732, and 3.2 grams Epi-Cure 8799 was stirred to produce a homogeneous solution. This solution was cured for 48 hours at room temperature plus postcuring for 18 hours at 55° C. The $T_g$ for the cured material is 19° C. and the refractive index is 1.526.

Formulation D

A mixture comprising 1.5 grams DER 332, 1 gram DER 732, 0.25 gram RD-1, 2.5 grams Epo-Tek 310A, and 1.63 grams Epi-Cure 8799 was stirred until a homogeneous solution was produced. This solution was cured for 48 hours at room temperature and postcured for 40 hours at 20° C. The $T_g$ for the cured adhesive is 6° C. and the refractive index is 1.522.

Formulation E

A mixture composed of 2.5 grams DER 332, 2.5 grams DER 732, and 1.55 grams Epi-Cure 8799 was stirred to yield a homogeneous solution. This solution was cured for 48 hours at room temperature followed by postcuring for 40 hours at 55° C. The $T_g$ for the cured material is 10° C. and the refractive index is 1.525.

Formulation F

A mixture consisting of 3.5 grams Anthiol R-12, 1.75 grams WC-68, 1.75 grams RD-1, and 1.58 grams Anchamine 1608, an aliphatic amine curing agent, was stirred until a homogeneous solution was obtained. This solution was cured for 48 hours at room temperature followed by a postcure of 25 hours at 55° C. The $T_g$ for the cured material is 26° C. and the refractive index is 1.525.

Formulation G

A mixture comprising 1.5 grams Anthiol R-12, 1.75 grams WC-68, 1.75 grams RD-1, and 1.33 grams Anchamine 1608 was stirred to produce a homogeneous solution. This solution was cured for 48 hours at room temperature plus a postcure of 60 hours at 55° C. The $T_g$ for the cured material is 19° C. and the refractive index is 1.525.

Formulation H

A mixture composed of 3 grams Epo-Tek 310A, 2 grams XB-4122, and 2.35 grams Epo-Tek 310B was stirred to provide a homogeneous solution. This solution was cured for 48 hours at room temperature followed by a postcure of 60 hours at 55° C. The refractive index of the cured resin is 1.520.

Formulation I

A mixture consisting of 2.5 grams Epo-Tek 310A, 2 grams Epo-Tek 310B, and 1 gram DY-023 was stirred until a homogeneous solution was obtained. The solution was cured for 48 hours at room temperature and then postcured for 90 hours at 55° C. This adhesive exhibited a $T_g$ of 10° C. and a refractive index of 1.523.

Formulation J

A mixture comprising 2 grams DER 332, 2 grams DER 732, 6 grams XB-4122, and 2.4 grams Epi-Cure 8799 was stirred to produce a homogeneous solution. This solution was cured for 48 hours at room temperature followed by a postcure of 50 hours at 55° C.

Formulation K

A mixture composed of 4 grams DER 332, 2 grams DER 732, 4 grams XB-4122, and 2.8 grams Epi-Cure 8799 was stirred to yield a homogeneous solution. This solution was cured at room temperature for 48 hours and postcured for 50 hours at 55° C.

I claim:

1. A three-component laminated lens structure exhibiting optical quality transmission which does not delaminate after repeated thermal cyclings over the temperature range of −40° to +80° C. and does not delaminate or demonstrate significant haze after exposure to high humidities for extended periods of time, said lens consisting of:
   (a) a thin inorganic glass layer having a linear coefficient of thermal expansion within the range of about 60–120×10$^{-7}$/° C.;
   (b) an organic plastic layer having a linear coefficient of thermal expansion within the range of about 200–700×10$^{-7}$/° C.; and
   (c) an organic adhesive that exhibits flexibility, and can be cured at temperatures in the vicinity of room temperature which bonds said glass layer and said plastic layer into an essentially stress-free assemblage;
wherein the power of said lens results from a curvature in the rear surface of said plastic layer.

2. A lens according to claim 1 wherein said glass layer is a photochromic glass.

3. A lens according to claim 1 wherein said organic plastic is a resin selected from the group consisting of an acrylic, an epoxy, a polycarbonate, a silicone, a urethane, and a polyimide.

4. A lens according to claim 3 wherein said organic plastic has a coefficient of thermal expansion within the range of about 400–600×10$^{-7}$/° C.

5. A lens according to claim 1 wherein said organic adhesive is a resin selected from the group consisting of an acrylic, an epoxy, a polycarbonate, a silicone, and a urethane.

6. A lens according to claim 5 wherein said organic adhesive consists of an aliphatic epoxy resin cured with an aliphatic amine.

7. A lens according to claim 5 wherein said organic adhesive consists of an aliphatic epoxy resin plus an aromatic monofunctional diluent cured with an aliphatic amine curing agent.

8. A lens according to claim 5 wherein said organic adhesive consists of an aromatic epoxy resin cured with an aliphatic amine.

9. A lens according to claim 1 wherein the transition temperature $T_g$ of said adhesive ranges between about 0°–30° C.

10. A lens according to claim 1 wherein each of the three components exhibits essentially the same refractive index.

11. A lens according to claim 10 wherein each of the three components exhibits a refractive index of about 1.523.

12. A lens according to claim 1 wherein the thickness of said adhesive is essentially constant across the diameter of said lens.

13. A lens according to claim 1 wherein the thickness of said adhesive is about 0.0075″–0.020″.

14. A lens according to claim 1 wherein said adhesive has a curing temperature between about 0°–30° C.

15. A lens according to claim 1 wherein the thickness of said glass layer is about 0.5–1.5 mm.

16. A lens according to claim 15 wherein the thickness of said glass layer is about 1–1.25 mm.

17. A lens according to claim 1 wherein said glass layer and said adhesive are plano layers.

18. A five-component laminated lens structure exhibiting optical quality transmission which does not delaminate after repeated thermal cyclings over the temperature range of −40° to +80° C. and does not delaminate or demonstrate significant haze after exposure to high humidities for extended periods of time, said lens consisting of:
   (a) a first organic plastic layer having a linear coefficient of thermal expansion within the range of about $200-700 \times 10^{-7}/°$ C.;
   (b) a first organic adhesive that exhibits flexibility and can be cured at temperatures in the vicinity of room temperature;
   (c) a thin inorganic glass layer having a linear coefficient of thermal expansion within the range of about $60-120 \times 10^{-7}/°$ C.;
   (d) a second organic adhesive that exhibits flexibility and can be cured at temperatures in the vicinity of room temperature; and
   (e) a second organic plastic layer having a linear coefficient of thermal expansion within the range of about $200-700 \times 10^{-7}/°$ C.;
wherein said adhesive bonds said glass layer to said plastic layers into an essentially stress-free assemblage.

19. A lens according to claim 18 wherein the composition of the first and second organic plastic layers is the same and the composition of the first and second organic adhesives is the same.

20. A lens according to claim 18 wherein said first and second organic plastics are resins selected from the group consisting of an acrylic, an epoxy, a polycarbonate, a silicone, a urethane, and a polyimide.

21. A lens according to claim 18 wherein said first end second organic adhesives are resins selected from the group consisting of an acrylic, an epoxy, a polycarbonate, a silicone, and a urethane.

22. A three-component laminated lens structure exhibiting optical quality transmission which does not delaminate after repeated thermal cyclings over the temperature range of −40° to +80° C. and does not delaminate or demonstrate significant haze after exposure to high humidities for extended periods of time, said lens comprising:
   (a) an inorganic glass layer having a thickness of about 0.5–1.5 mm and a linear coefficient of thermal expansion within the range of about $60-120 \times 10^{-7}/°$ C.;
   (b) an organic plastic layer consisting of a resin selected from the group consisting of an acrylic, an imide-modified acrylic, an epoxy, a polycarbonate, a silicone, a urethane, and a polyimide having a linear coefficient of thermal expansion within the range of about $200-700 \times 10^{-7}/°$ C.; and
   (c) an organic adhesive layer consisting of a resin selected from the group consisting of an acrylic, an epoxy, a polycarbonate, a silicone, and a urethane that exhibits flexibility and can be cured at temperatures in the vicinity of room temperature which bonds together said glass layer.

23. A lens according to claim 22 wherein said organic plastic has a coefficient of thermal expansion within the range of about $400-600 \times 10^{-7}/°$ C.

24. A lens according to claim 22 wherein said organic adhesive consists of an aliphatic epoxy resin cured with an aliphatic amine.

25. A lens according to claim 22 wherein each of the three components exhibits essentially the same refractive index.

26. A lens according to claim 22 wherein the thickness of said adhesive is essentially constant across the diameter of said lens.

27. A three-component laminated lens structure exhibiting optical quality transmission which does not delaminate after repeated thermal cyclings over the temperature range of −40° to +80° C. and does not delaminate or demonstrate significant haze after exposure to high humidities for extended periods of time, said lens comprising:
   (a) an inorganic glass layer having a thickness of about 0.5–1.5 mm and a linear coefficient of thermal expansion within the range of about $60-120 \times 10^{-7}/°$ C.;
   (b) an organic plastic layer consisting of an epoxy resin and having a linear coefficient of thermal expansion within the range of about $400-600 \times 10^{-7}/°$ C.; and
   (c) an organic adhesive layer consisting of an epoxy resin cured with an aliphatic amine that exhibits flexibility and can be cured at temperatures in the vicinity of room temperature which bonds together said glass layer and said plastic layer;
wherein each of the three components exhibits essentially the same refractive index and the thickness of said adhesive is essentially constant across the diameter of said lens.

* * * * *

UNITED STATES PATENT AND TRADEMARK OFFICE
CERTIFICATE OF CORRECTION

PATENT NO. : 4,793,703
DATED : 12-27-88
INVENTOR(S) : Edward R. Fretz, Jr.

It is certified that error appears in the above-identified patent and that said Letters Patent is hereby corrected as shown below:

Column 1, line 29, change "lense" to --lenses--.

Column 4, line 5, change "$10^7$" to --$10^{-7}$--.

Column 4, line 62, change "$10^7$" to --$10^{-7}$--.

Column 5, line 38, change "$10^7$" to --$10^{-7}$--.

Column 6, line 35, change "0.25" to --0.25"--.

Signed and Sealed this

Nineteenth Day of September, 1989

Attest:

DONALD J. QUIGG

Attesting Officer

Commissioner of Patents and Trademarks